Patented July 13, 1937

2,086,574

UNITED STATES PATENT OFFICE 2,086,574

VAT DYE POWDER AND METHOD OF MAKING SAME

Earl L. Pelton, Midland, Mich., assignor to The Dow Chemical Company, Midland, Mich., a corporation of Michigan No Drawing. Application May 29, 1935, Serial No. 24,081

14 Claims. (Cl. 8—6)

This invention concerns certain improved vat dye powders suitable for incorporating in printing gums.

For printing purposes, a vat dye is marketed in the form of an aqueous paste or a powder containing certain other agents, e. g., dispersing and wetting agents, which aid in incorporating the dye with a printing gum to form a uniform printing composition, since the dye alone cannot readily be incorporated with printing gum to form a satisfactory printing composition.

To be satisfactory for printing purposes, a vat dye paste or powder must meet certain requirements, viz., it must contain the dye in the form of fine particles, it must be stable against change in composition or printing quality during storage, and it must incorporate readily with a printing gum to form a uniform composition containing the dye in a finely divided and highly dispersed form which will take strongly and evenly on fibers. In general, the printing pastes which have been marketed have met such requirements more satisfactorily than the powders and accordingly have met with far greater commercial success. However, most dye pastes possess certain disadvantageous features, e. g. they are spoiled if permitted to freeze, and on standing open to the air, surface drying occurs rapidly with formation of coarse dye particles. Such coarse particles do not break up readily when the paste is incorporated with a printing gum and their presence frequently results in the production of uneven prints.

I have found that a vat dye powder, which satisfactorily meets the above requirements and which is not susceptible to change in composition or printing quality during storage under usual conditions, may be prepared by adding alkali metal acetate to an aqueous paste or slurry of the dye, drying the mixture until the acetate is rendered substantially anhydrous, and grinding or otherwise pulverizing the residue to a powder of desired fineness. The dye powder product is more than a mechanical mixture of the dye and acetate. It contains said ingredients integrally mixed with one another and incorporates more readily with printing gum to produce a printing composition of better quality than does a powder having the same composition but prepared by mixing anhydrous alkali metal acetate with the dye in dry form and grinding the mixture to the same degree of fineness. The invention, then, consists in the vat dye powders and method of making the same hereinafter fully described and particularly pointed out in the claims.

In preparing a vat dye powder of the present class, I mix an alkali metal acetate, e. g. sodium acetate, with an aqueous paste or slurry of a finely divided vat dye to obtain an aqueous sodium acetate solution containing the dye in suspension. The acetate may be added as a solid or in aqueous solution, the only requirement being that the mixture should contain sufficient water largely to dissolve it. The aqueous dye paste or slurry employed in making such mixture may be the aqueous dye paste, or filter press cake, obtained directly in the manufacture of the dye by usual methods, or it may be a paste prepared from a dry dye, for instance by dissolving the dye in sulphuric acid and pouring the solution into water to precipitate the dye in paste form. The proportions in which the dye and alkali metal acetate are mixed may be varied widely to meet demands of the trade, but the dye powders are of best quality when they contain a somewhat greater weight of acetate than of dye. Ordinarily, I prefer to employ an alkali metal acetate in a proportion corresponding to between about 1.25 and 8 parts by weight of anhydrous acetate per part of dry dye.

Water is evaporated from the aqueous mixture of alkali metal acetate and dye, until the acetate is rendered substantially anhydrous. The drying operation may be carried out at any temperature sufficient to render the acetate anhydrous and below that at which the dye is decomposed, but is ordinarily carried out at temperatures below 200° C. By applying vacuum, the mixture may satisfactorily be dried at only moderately elevated temperatures, e. g. at 60° C. or above. The residual mixture is ground to a powder of desired fineness.

The character of the dye powder product may be influenced to a considerable extent by the procedure followed in carrying out the drying operation, but such procedure may be varied widely and still produce a powder of good quality. For instance, I have produced powders of excellent printing quality by drying aqueous mixtures of a vat dye and sodium acetate in each of the following ways:—(1) drying the mixture slowly in an oven maintained at about 120°–130° C.; (2) evaporating the aqueous mixture until the water content corresponds to that necessary to convert the acetate to its trihydrate, then cooling with stirring to form crystals of the sodium acetate trihydrate intimately mixed with the dye, and thereafter continuing the drying under vacuum at temperatures below those required to melt the acetate, i. e. at temperatures which are gradually increased from about 55° C. to 110° C. as drying continues; and (3) spraying the aqueous mixture onto a rotating drum heated to a temperature between 125° and 200° C. to evaporate the water and continuously scraping the dried powder from the drum. On the other hand, a powder of somewhat lower quality was obtained when an aqueous mixture of sodium acetate and a vat dye was dried in an oven heated to about 170° C. Even under such conditions, however, the powder product could be employed to produce prints of fair quality.

My dye powders are preferably neutral or alkaline, but a small proportion of acid may sometimes be present without detriment. In order to assure non-acidity in such powder, a base such as sodium or potassium carbonate is preferably incorporated therewith. A wetting agent such as glycol, glycerine, or other polyhydric alcohol may be incorporated in the powder to increase the brightness of prints made therefrom. Such wetting agent is preferably employed in a proportion not exceeding 7 per cent the weight of the dry powder and is never employed in amount sufficient to render the powder gummy. I have also observed that by incorporating dispersing agents such as alkyl esters of sulphuric acid, aliphatic and aromatic sulphonic acids, salts of such sulphonic acids, condensation products of such sulphonic acids with aldehydes and phenols, etc., in my powders prints from the same are deepened in color. A number of dispersing agents of the types just mentioned are marketed under the trade names Nekal, Barretan, Sorbanol, Super Spruce Extract, Gardinol, Igepon, and Tamol. Other printing assistants such as borax, starch, dextrine, alkali metal formates and glycollates, ferric sulphate, anthraquinone, urea and its condensation products, sulphonated mineral and vegetable oils, etc., may also be incorporated in my powders if desired. Any of the above-mentioned agents may be incorporated directly in my dye powder products or may be added to the aqueous mixture of a vat dye and alkali metal acetate before drying such mixture to form the powder.

The following examples illustrate certain ways in which the principle of my invention has been applied, but are not to be construed as limiting the invention.

*Example 1*

To a thin paste of water and 200 grams of finely divided ciba blue 2BD (Color Index No. 1184) was added 600 grams of anhydrous sodium acetate. The mixture was heated over an open flame until of a creamy consistency and then sprayed while hot onto a rotating drum internally heated to about 170° C., whereby water was evaporated rapidly from the mixture. The residue was scraped continuously from the drum surface and ground to a powder sufficiently fine to pass a 100 mesh screen. The powder so obtained was readily incorporated with printing gum to obtain a composition which gave blue prints of good color and uniformity.

*Example 2*

A mixture was prepared from:—
(1) An aqueous dye paste containing 25 grams ciba blue 2BD (Color Index No. 1184) and 92 grams water
(2) 2.5 grams Tamol
(3) 1.2 grams anhydrous sodium carbonate
(4) 118 grams sodium acetate (60.5 per cent by weight anhydrous sodium acetate, 39.5 per cent water of hydration).

The above ingredients were mixed, heated over an open flame until reduced to a thick paste, and thereafter heated in an oven maintained at 125°–130° C. until all water was evaporated. The residue was ground so as to pass through a 100 mesh sieve. The powder, so obtained, was readily incorporated in printing gum to form a uniform mixture which printed evenly giving a good shade of blue of fair brightness.

*Example 3*

A mixture was prepared from:—
(1) An aqueous dye paste containing 100 grams ciba blue 2BD (Color Index No. 1184) and 365 grams water
(2) 10 grams Tamol
(3) 5 grams anhydrous sodium carbonate
(4) 20 grams glycerine
(5) 428 grams sodium acetate (62 per cent anhydrous sodium acetate, 38 per cent water of hydration).

The ingredients were mixed, boiled to a thick cream over an open flame, and the hot creamy mixture was sprayed onto a rotating drum heated to about 180° C. Water was evaporated rapidly from the material on the drum leaving a dry residue which was scraped from the drum surface as a coarse powder. The powder was ground so as to pass through a 100 mesh sieve. The powder was readily incorporated in printing gum to form a uniform printing composition which gave blue prints of good weight, shade, brightness, and uniformity.

*Example 4*

A mixture was prepared from:—
(1) An aqueous dye paste containing 50 grams ciba blue 2BD (Color Index No. 1184) and 443 grams water.
(2) 2.5 grams anhydrous sodium carbonate
(3) 10 grams glycerine
(4) 228 grams sodium acetate (62 per cent anhydrous sodium acetate, 38 per cent water of hydration).

The procedure followed in preparing the powder was similar to that described in Example 3. The dye powder product was readily incorporated in printing gum to obtain a composition which gave blue prints of good shade, brightness, and uniformity.

*Example 5*

A mixture was prepared from:—
(1) An aqueous dye paste containing 100 grams of 5.5′-dichloro-7.7′-dimethyl-thioindigo and 365 grams of water
(2) 10 grams Tamol
(3) 5 grams anhydrous sodium carbonate
(4) 20 grams glycerine
(5) 589 grams sodium acetate (62 per cent anhydrous sodium acetate and 38 per cent water of hydration).

The procedure employed in preparing the powder was similar to that described in Example 3, whereby a powder containing approximately 20 per cent by weight of dye was obtained. The powder was readily incorporated in printing gum, forming a uniform composition which gave red prints of good weight, shade, brightness, and uniformity.

*Example 6*

A mixture was prepared from:—
(1) An aqueous dye paste containing 200 grams ciba blue R (Color Index No. 1182) and 642 grams water
(2) 20 grams Tamol
(3) 10 grams anhydrous sodium carbonate
(4) 40 grams glycerine
(5) 230 grams anhydrous sodium acetate.

The procedure followed in preparing the powder was similar to that described in Example 3, the powder containing 36.4 per cent by weight of the dye. The product incorporated readily to form a printing composition which gave blue prints of good weight, shade, brightness, and uniformity.

I have employed a wide variety of other vat dyes, e. g. ciba scarlet G (Color Index No. 1228), indanthrene blue G. C. D. (Color Index No. 1113), indanthrene yellow G (Color Index No. 1118), etc., in dye powders of the present class. Insofar as I am aware, any vat dye, or mixture of vat dyes, may successfully be used in such powders.

Although I prefer sodium acetate over the other alkali metal acetates as an ingredient in my vat dye powders, since it is less expensive and somewhat more effective than such other acetates in promoting absorption of a vat dye by printing gum, I have prepared dye powders of good quality containing a mixture of sodium and potassium acetates, as well as potassium acetate alone.

In preparing a dye powder by the method hereinbefore described, the operation of drying an aqueous mixture containing a vat dye and alkali metal acetate improves the quality of print obtainable from such dye. For instance, by adding water to a powder of the present type and again drying it as hereinbefore described, the printing quality of the powder is frequently improved to a noticeable extent, i. e. from a powder which has been subjected to two such drying operations, prints of deeper color may be obtained than from the same powder which has been subjected to only one such drying operation.

Although the dye powders herein disclosed are particularly valuable for printing purposes, they may also be employed for other purposes, e. g. as agents in vat dyeing.

Other modes of applying the principle of my invention may be employed instead of those explained, change being made as regards the compositions and method of making the same herein disclosed, provided the compounds or steps stated by any of the following claims or the equivalent of such stated compounds or steps be employed.

I therefore particularly point out and distinctly claim as my invention:—

1. In a method of making a vat dye powder, the step which consists in drying an aqueous mixture comprising a vat dye and alkali metal acetate.

2. In a method of making a vat dye powder, the step which consists in evaporating an aqueous mixture comprising a vat dye and an alkali metal acetate until the acetate is rendered substantially anhydrous.

3. In a method of making a vat dye powder, the steps which consist in preparing an aqueous mixture containing sodium acetate and a vat dye in finely divided condition and thereafter removing water from the mixture until the acetate is rendered substantially anhydrous.

4. In a method of making a vat dye powder, the steps which consist in suspending a vat dye in an aqueous sodium acetate solution and evaporating water from the mixture at temperatures not appreciably exceeding 130° C. until the sodium acetate is rendered substantially anhydrous.

5. In a method of making a vat dye powder, the steps which consist in suspending a vat dye in an aqueous sodium acetate solution, thereafter evaporating water from the mixture until the residual water is present in amount corresponding approximately to that required to convert the sodium acetate into its trihydrate, cooling the mixture with stirring to crystallize sodium acetate trihydrate, and thereafter continuing the evaporation at temperatures sufficiently low so that the sodium acetate remains solid.

6. In a method of making a vat dye powder, the steps which consist in adding sodium acetate to an aqueous mixture containing a vat dye in finely divided condition and thereafter applying a thin layer of the mixture to a moving surface heated sufficiently to evaporate the water, and removing the residual dried powder from said surface shortly after it is formed.

7. A vat dye powder comprising a vat dye and a substantially anhydrous alkali metal acetate.

8. A vat dye powder comprising a vat dye and substantially anhydrous sodium acetate.

9. A vat dye powder comprising a vat dye, substantially anhydrous alkali metal acetate, and a dispersing agent.

10. A vat dye powder comprising a vat dye, substantially anhydrous alkali metal acetate, and a wetting agent.

11. A vat dye powder comprising a vat dye, substantially anhydrous sodium acetate, a dispersing agent, and glycerine.

12. A vat dye powder comprising a vat dye and a substantially anhydrous alkali metal acetate, prepared by drying an aqueous mixture containing said ingredients.

13. A vat dye powder comprising a vat dye and substantially anhydrous sodium acetate, prepared by drying an aqueous mixture containing said ingredients and grinding the residue.

14. A vat dye powder comprising a vat dye, substantially anhydrous sodium acetate, a dispersing agent, and glycerine, prepared by drying an aqueous mixture of said ingredients and grinding the residue.

EARL L. PELTON.